US008157443B2

(12) United States Patent
Khan

(10) Patent No.: US 8,157,443 B2
(45) Date of Patent: Apr. 17, 2012

(54) RADIOGRAPH CASSETTE COVER

(76) Inventor: Dayna N. Khan, College Point, NY (US)

( * ) Notice: Subject to any disclaimer, the term of this patent is extended or adjusted under 35 U.S.C. 154(b) by 268 days.

(21) Appl. No.: 12/585,561

(22) Filed: Sep. 17, 2009

(65) Prior Publication Data

US 2010/0072097 A1 Mar. 25, 2010

Related U.S. Application Data

(60) Provisional application No. 61/192,613, filed on Sep. 19, 2008.

(51) Int. Cl.
*G03B 42/04* (2006.01)
*B65D 85/48* (2006.01)

(52) U.S. Cl. .................... 378/184; 206/455; 206/459.1; 378/165; 383/209

(58) Field of Classification Search .................. 378/162, 378/163, 165, 166, 182, 184; 206/449, 453–456, 206/459.1, 459.5; 383/52, 93, 207, 209
See application file for complete search history.

(56) References Cited

U.S. PATENT DOCUMENTS

| | | | | |
|---|---|---|---|---|
| 3,443,093 | A * | 5/1969 | Pierson et al. | 378/169 |
| 3,720,035 | A * | 3/1973 | Rutter | 206/455 |
| 4,194,622 | A * | 3/1980 | Lewis | 206/363 |
| 4,759,643 | A * | 7/1988 | Canno | 383/84 |
| 4,953,193 | A * | 8/1990 | Robinson | 378/162 |
| 5,008,920 | A | 4/1991 | Gralak | |
| 5,102,234 | A * | 4/1992 | Levy | 383/38 |
| 5,189,689 | A | 2/1993 | Fabian | |
| 5,195,122 | A | 3/1993 | Fabian | |
| 5,268,956 | A | 12/1993 | Fabian | |
| 5,307,397 | A | 4/1994 | Fabian | |
| 5,394,987 | A | 3/1995 | Markl et al. | |
| 5,407,277 | A * | 4/1995 | Burke et al. | 206/459.1 |
| 5,555,284 | A | 9/1996 | Kishigami | |
| 5,712,486 | A * | 1/1998 | Soltani et al. | 378/184 |
| 6,181,772 | B1 | 1/2001 | Reina et al. | |
| 6,198,807 | B1 | 3/2001 | DeSena | |
| 6,827,214 | B2 * | 12/2004 | Alzner et al. | 206/455 |
| 7,066,645 | B2 | 6/2006 | Reid et al. | |
| 2005/0226388 | A1 | 10/2005 | Reid et al. | |
| 2005/0278991 | A1 * | 12/2005 | Araujo | 40/6 |
| 2007/0248256 | A1 | 10/2007 | Fabian | |
| 2008/0037711 | A1 * | 2/2008 | Peterfy et al. | 378/162 |
| 2008/0095322 | A1 | 4/2008 | Caminade et al. | |

* cited by examiner

*Primary Examiner* — Luan K Bui
(74) *Attorney, Agent, or Firm* — Richard C. Litman

(57) ABSTRACT

The disposable radiograph cassette cover is formed of two sheets of x-ray transparent pliable material having a low coefficient of friction to facilitate sliding the cover and contained cassette beneath a patient for the radiography procedure. The cover includes distinctively colored integral radiopaque anatomical markers disposed over a portion of the film or plate in the cassette to shield that portion of the underlying plate during the procedure. The plate is thus automatically marked during the procedure to show the side of the body where the cassette and cover were placed. The cassette is sealed within the cover by an adhesive flap, with the adhesive and/or release sheet also being color-coded to indicate the side to which the cover is to be used. The cassette is removed from the cover by tearing off the adhesively sealed end along provided perforations.

18 Claims, 3 Drawing Sheets

RADIOGRAPH CASSETTE COVER

CROSS-REFERENCE TO RELATED APPLICATION

This application claims the benefit of U.S. Provisional Patent Application Ser. No. 61/192,613, filed Sep. 19, 2008.

BACKGROUND OF THE INVENTION

1. Field of the Invention

The present invention relates generally to radiographic equipment and supplies, and particularly to a radiograph cassette cover for use in protecting a radiograph cassette as used in the medical radiological or x-ray field.

2. Description of the Related Art

X-ray radiology is commonly used in the medical field to gain information regarding the internal structure of patients, e.g., broken bones, kidney stones, etc. The basic procedure initially comprises inserting a photosensitive film sheet or plate in a holder (generally known as a radiograph cassette) and placing the radiograph cassette as required adjacent to (e.g., beneath) the patient. The radiation (x-ray) source is then oriented relative to the patient and cassette and activated to transmit penetrating radiation through the patient, thereby exposing the film plate in the radiograph cassette. The cassette is transferred to a location where the film can be safely removed from the cassette for development, and the film is analyzed by an appropriate medical professional after development.

While the use of radiography in the diagnosis of internal problems has certainly proven to be an advance in the medical field, the general procedure is not without certain problems. A major recurring problem is the difficulty in ascertaining and/or verifying the lateral placement of the cassette relative to the patient, after the radiograph has been taken and the film or plate removed from the cassette. It is required that some means of identifying the lateral placement be provided, and this is generally done by placing a separate anatomical marker (generally a letter "L" or "R", indicating "Left" or "Right") on the cassette at the time it is placed adjacent the patient for the procedure. Radiologists generally use radiopaque markers that are placed atop the cassette, with the marker blocking the radiation energy directly beneath the marker and keeping that portion of the film unexposed. Thus, the exposed and developed plate will show an indication of the marker placed on the cassette during the procedure. However, such markers are prone to misplacement and loss, and the radiologist may be required to purchase replacements out of his or her own pocket. As the markers are specialty items used in the medical field, they are comparatively costly. Moreover, if the marker should be dislodged from its placement on the cassette before the x-ray is taken, there will be no record on the plate of the lateral placement of the plate relative to the patient during the procedure.

Another problem in this field is the potential difficulty in placing a radiograph cassette beneath the patient. Oftentimes patients are relatively heavy, and a radiographic technician or radiologist of slight build may have considerable difficulty in placing the radiograph cassette beneath a comatose or immobile patient without assistance. Much the same can be said for the removal of the cassette after the x-ray procedure has been accomplished.

Also, while the medical field endeavors to prevent the transmission of infection and disease, the use of reusable instruments and equipment can make this difficult at times. Radiograph cassettes are prone to contamination from bodily fluids, e.g., blood in the case of physical trauma patients, with such fluids and their potential for infection and disease often being inadvertently transferred during the often hectic process in working with a seriously injured patient.

Thus, a radiograph cassette cover solving the aforementioned problems is desired.

SUMMARY OF THE INVENTION

The radiograph cassette cover serves to contain and protect a radiographic cassette and its included film or plate during a medical radiographic or x-ray procedure. The cover is an economically disposable device formed of two sheets of thin, flexible plastic or other suitable material having a low coefficient of friction in order to facilitate the placement of the cover and its contained radiographic cassette beneath a patient. The plastic or other material is transparent to electromagnetic frequencies used in the medical x-ray field, and is preferably transparent or translucent in the visible spectrum as well.

A radiopaque anatomical marker is integrated into a portion of each sheet, and serves to block the passage of radiation energy therethrough in order to provide a corresponding unexposed area on the underlying photographic plate to indicate the lateral placement of the radiograph cassette placed therein during the radiographic procedure. The markers are preferably color-coded to facilitate identification of the proper cassette cover during preparation for the radiological procedure. Additional coding may be provided by coloring an adhesive band and/or release sheet disposed along the closure flap of the cover.

The cover is economically disposable, as noted further above. The radiographic cassette is placed within the appropriate cover (left side or right side cover) and sealed therein by means of the adhesive closure flap. When the radiographic procedure has been completed, the closure end of the cover is torn off along previously formed perforations, the cassette is removed therefrom for development of the radiographic film or plate, and the cover is discarded. The imposition of the anatomical marker of the cover over a portion of the cassette and film or plate contained therein provides an automatic means of identifying the side of the body where the cassette and plate were placed during the radiographic procedure after the plate is removed from the cassette.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
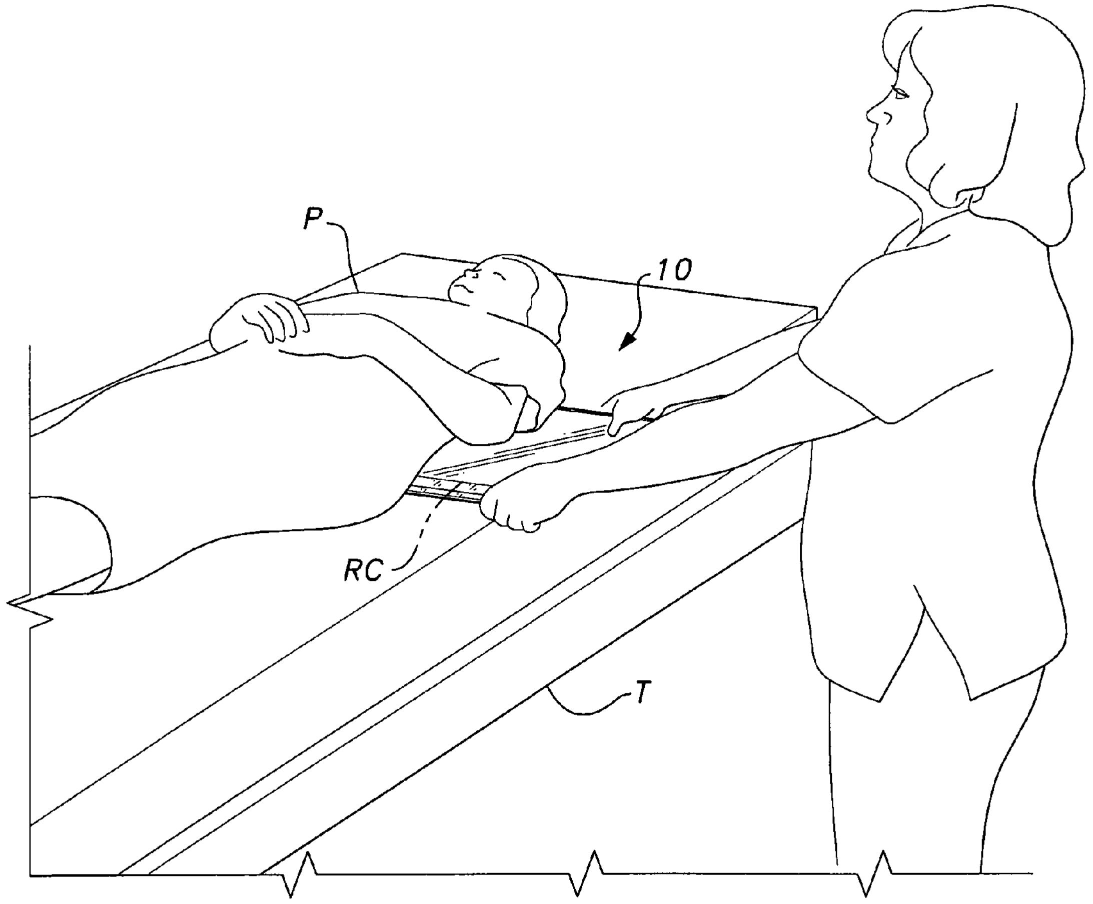
FIG. 1 is an environmental, perspective view of a radiograph cassette cover according to the present invention.

The radiograph cassette cover is a disposable cover for a radiograph cassette, which is used in the medical field for radiography (x-ray) procedures. FIG. 1 of the drawings provides an environmental perspective view showing the cover 10 with a radiograph cassette RC enclosed therein, the cover 10 being inserted beneath a patient P. The cover 10 is preferably formed of thin, flexible or pliable sheets of material having a relatively low surface coefficient of friction, enabling the cover 10 to slide reasonably freely between the patient P and underlying table T or other support. Polyethylene plastic is an example of such a suitable material. The plastic is transparent to electromagnetic energy, such as x-rays. The material may be made to be transparent to the visible spectrum as well, which is preferred in the radiograph cassette cover 10 and its embodiments. However, other plastic materials (e.g., Mylar, etc.) may be used as desired or, alternatively, certain fabrics are acceptable.

Figure 2:
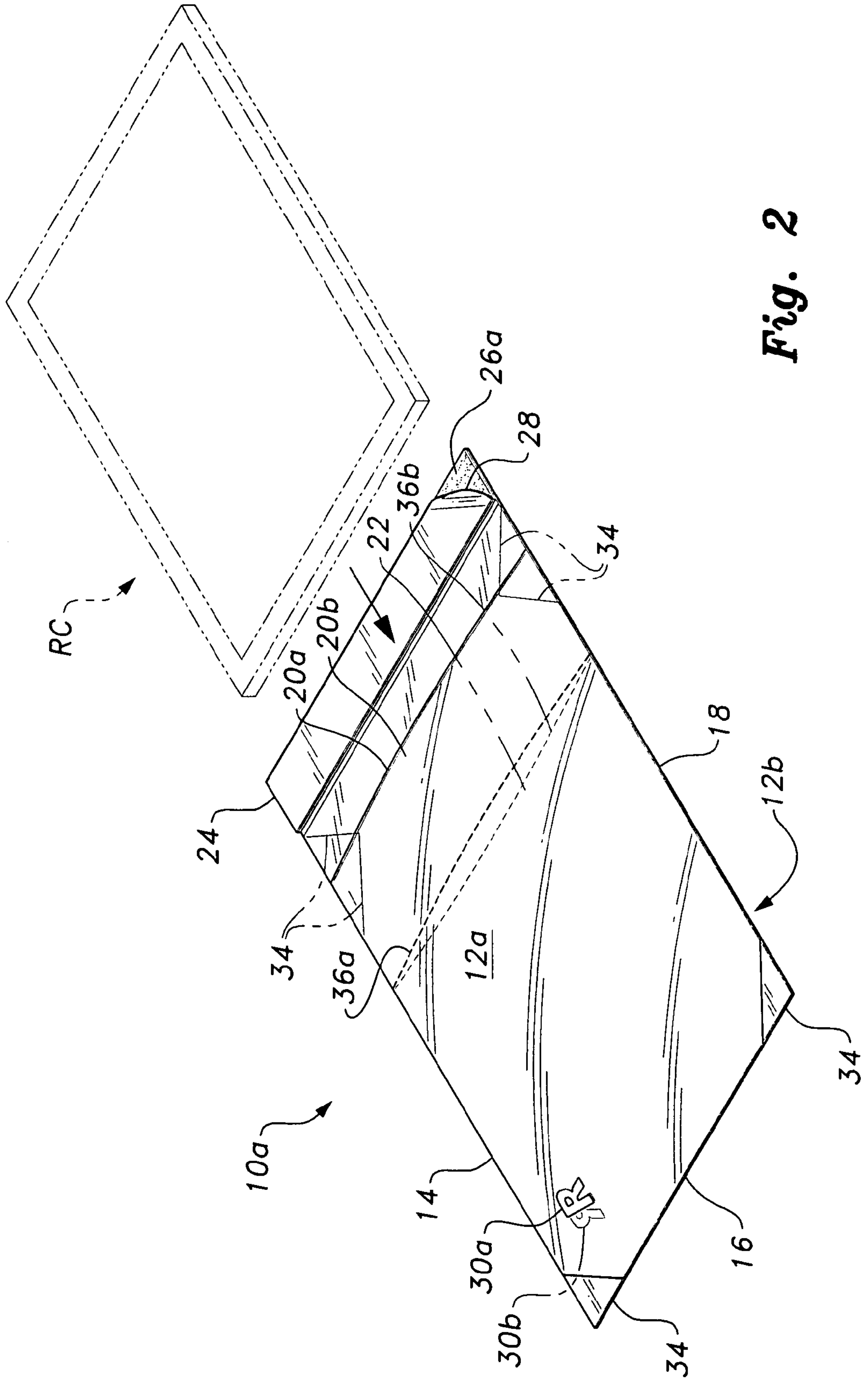
FIG. 2 is an exploded perspective view of the radiograph cassette cover of FIG. 1, shown open to accept a radiograph cassette therein.
Figure 3:
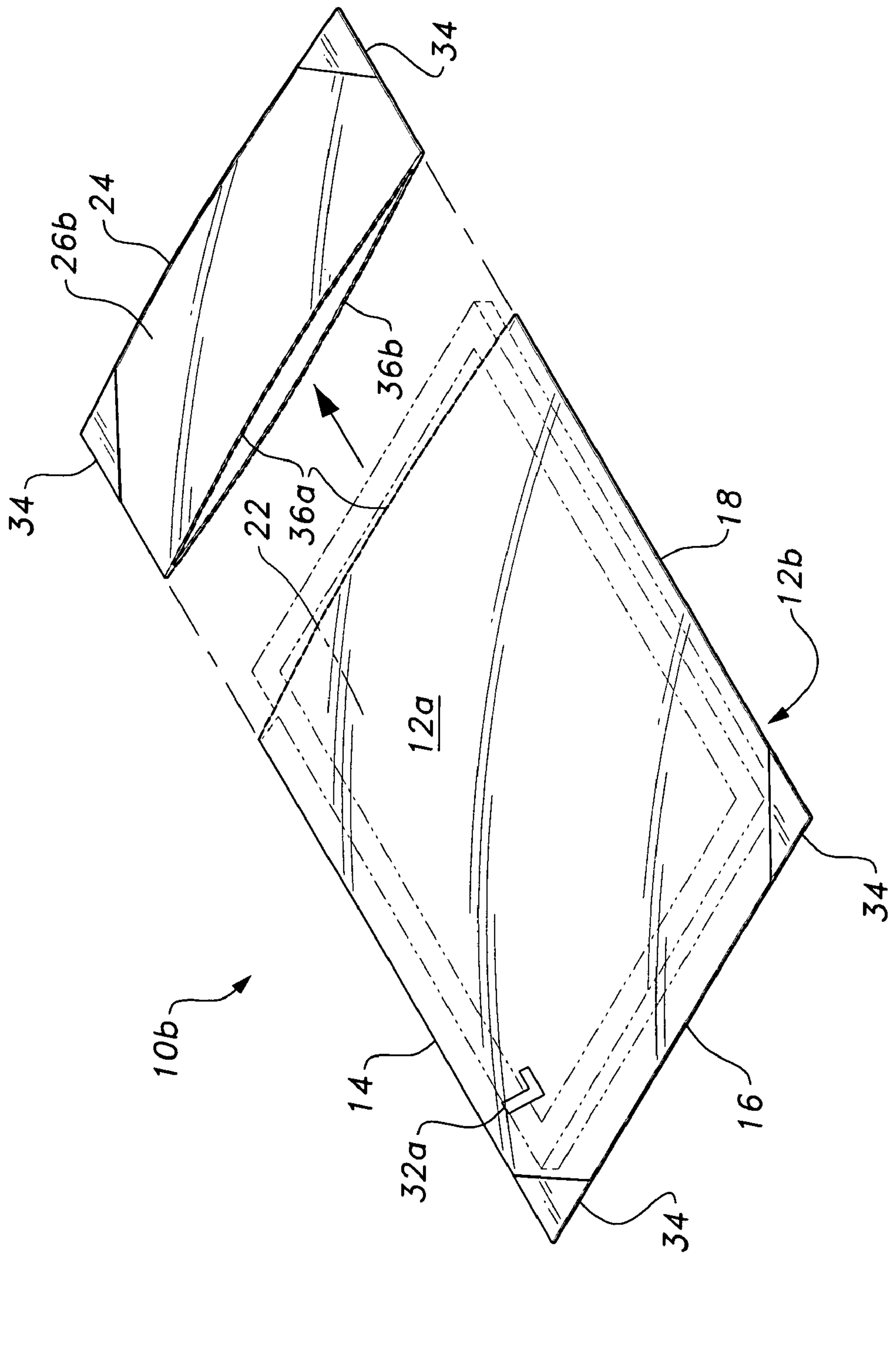
FIG. 3 is an exploded perspective view of an alternative embodiment of a radiograph cassette cover according to the present invention, showing the end separated therefrom for removal of the radiograph cassette from the cover.

FIG. 2 provides a perspective view of a first embodiment of the radiograph cassette cover 10*a*, shown with a radiograph cassette RC separated therefrom and in broken lines. An alternate cover 10*b* is illustrated in FIG. 3, with the difference between the covers 10*a* and 10*b* being their indicators for placement beneath the right or left side of the patient, respectively, during the radiography procedure. The general cover 10 of FIG. 1, right-side cover 10*a* of FIG. 2, and left-side cover 10*b* shown in FIG. 3 are each formed of a first sheet 12*a* and a second sheet 12*b*. The two sheets 12*a* and 12*b* have congruent first through third edges 14, 16, and 18 sealed to one another, defining a radiograph cassette pocket 22 therebetween. The respective fourth edges 20*a* and 20*b* of the two sheets 12*a*, 12*b* are open to allow the insertion of a radiograph cassette RC into the pocket 22.

A closure flap 24 extends from the fourth edge 20*b* of the second sheet 12*b*. The flap 24 has an adhesively coated attachment surface 26*a* disposed thereon. A release sheet 28 is removably disposed over the adhesively coated attachment surface 26*a*, with one corner of the release sheet 28 shown lifted in FIG. 2 to illustrate the underlying adhesively coated attachment surface 26*a* of the flap 24. The opposite, folded-over external surface 26*b* is shown in FIG. 3, and as the flap 24 is an extension of the second sheet 12*b*, the external surface 26*b* of the flap 24 is also a smooth surface having a low coefficient of friction.

As the human body is laterally symmetrical, a radiograph taken of either side of the body may be mistaken for such a radiograph taken from the opposite side, i.e., the right front and the left rear views of the skeletal structure appear identical to one another, or often cannot be distinguished from one another without proper labeling. Accordingly, it is desirable that any radiograph includes means to identify which side of the body is represented. Conventionally, a separate radiopaque anatomical marker is placed atop the radiograph cassette, with the marker blocking or shielding the underlying photographic plate or film from radiation. When the plate or film is developed, the outline of the marker will appear on the film to identify the orientation of the radiograph. Conventionally these anatomical markers are color-coded red for right-side use, and blue for left-side use.

The radiograph cassette cover in its various embodiments also provides such means for the user to determine from which side of the body the radiograph is to be taken, or has been taken, after the film or plate has been exposed. The release sheet 28 and/or the adhesive surface 26*a* may be color-coded, e.g., red in the case of the right-side cover 10*a* illustrated in FIG. 2 of the drawings. A cover 10*b* intended for left-side use could be color-coded blue, the color showing through the transparent flap 24 after it has been folded over and adhered to the underlying edge of the upper or first sheet 12*a*. The use of the colors red for the right side and blue for the left side is conventional in the radiography field, but other colors may be used, if desired.

The above-described color-coded release sheet 28 and/or adhesive 26 serve to identify the proper orientation of the radiograph cassette cover 10*a* or 10*b*, but do not provide any means for marking the photographic plate or film during the radiograph procedure. Accordingly, the covers 10*a* and 10*b* include anatomical markers disposed integrally therewith to indicate the intended lateral anatomical placement of the covers and their included radiograph cassette during the radiograph procedure. In the exemplary cover 10*a* of FIG. 2, a radiopaque letter "R" is permanently and integrally disposed in a portion of each sheet 12*a* and 12*b*, to indicate that this cover 10*b* is to be placed or oriented with radiographs of the right side of the body. A first marker 30*a* is disposed upon the first sheet 12*a*, with an opposite second marker 30*b* disposed upon the opposite second sheet 12*b*. A portion of the second side marker 30*b* may be seen extending from beneath the upper first marker 30*a* in FIG. 2.

These two right-side "R" anatomical markers 30*a* and 30*b* are also preferably color-coded, e.g., are red, in order to indicate the use of the cover 10*a* in taking a radiograph of the right side of the body. Again, other colors, or other marker configurations, may be used, if desired. It will be seen that both the color-coding of the release sheet 28 and/or adhesive surface 26*a* and the anatomical markers, e.g., 30*a* and 30*b*, may be provided in any of the radiograph cassette covers, e.g., cover 10*a*, as desired. However, the provision of the anatomical markers 30*a*, 30*b* integrally with the cover sheets 12*a*, 12*b* may be considered sufficient by themselves so that color-coding the release sheet and/or adhesive is unnecessary or optional.

The left-side radiograph cassette cover 10*b* of FIG. 3 also includes anatomical markers, situated similarly to the markers 30*a* and 30*b* of the cover 10*a* of FIG. 2. Only a single marker 32*a* on the first or upper cover sheet 12*a* is shown in FIG. 3, as the radiograph cassette RC contained within the cover 10*b* would block the view of the underlying lower marker. As the cassette cover 10*b* is intended for left side use, the anatomical marker 32*a* comprises an upper case letter "L." The marker 32*a* is also preferably color-coded, e.g., blue, as is conventional in the radiographic field.

Preferably, some means of reinforcement of the radiograph cassette cover is provided to withstand the weight and rigidity of the radiographic cassette RC when it is placed within the cover. Accordingly, the corners of the cover may include reinforcement gussets 34 thereon, with the corner of each surface 12*a*, 12*b* including a corner reinforcement gusset thereon. Gussets 34 are provided on the lower sheet 12*b* to each side of the fold line, i.e., the fourth edge 20*b*, for the flap 24 adjacent to each edge 14 and 18. In this manner, when the flap 24 is folded over the upper sheet 12*a* the corresponding gusset reinforcements 34 to each side of the flap fold line or edge 20*b* overly one another to form complete gusset reinforcements at the now-closed upper corners of the cover, as shown on the removed upper edge and flap portion of the cover 10*b* of FIG. 3. As the cover 10 is intended for one-time disposable use, further strengthening and reinforcement is not required, but the corner reinforcement gussets 34 provide sufficient corner strength to prevent the radiograph cassette from tearing through one of the corners as the assembly is inserted or removed beneath a patient or in other handling.

The radiograph cassette cover 10*a* or 10*b* is intended for single use, to be disposed after that use, as noted further above. Once the radiograph cassette RC has been inserted into the cover, as indicated in FIG. 2, the release sheet 28 is removed from the flap 24, and the flap 24 is folded over to adhere to the upper surface of the first sheet 12a adjacent the previously open fourth edge 20a thereof. In FIG. 3, the radiograph cassette RC is shown being removed from a left side cover 10b. All of the covers 10a, 10b preferably include lines of weakening perforations 36a and 36b extending across the sheets 12a and 12b near and parallel to the fourth edges 20a and 20b of those sheets. Thus, the previously sealed fourth edges 20a, 20b of the cover 10a or 10b may be torn easily from the remainder of the cover by pulling the flap 24 and the portion of the cover 10a or 10b to which it is sealed. The adhesively sealed flap end of the cover separates from the remainder of the cover along the weakening perforation lines 36a and 36b.

Accordingly, the radiographic cassette covers 10a and 10b greatly facilitate the identification of the lateral position of a radiograph, without need for separate anatomical markers that are easily dislodged or lost during the procedure. The economical disposal of the cassette covers and their provision for protecting the radiograph cassette therein from contamination is also an important attribute of the covers that will be appreciated by those working in the medical radiology field.

It is to be understood that the present invention is not limited to the embodiments described above, but encompasses any and all embodiments within the scope of the following claims.

I claim:

1. A disposable radiograph cassette cover, comprising:

a first sheet having first through fourth edges;

a second sheet having first through fourth edges, the first through third edges of the second sheet being congruent with and sealed to the corresponding edges of the first sheet, the first and second sheets defining a radiograph cassette pocket therebetween;

a first radiopaque anatomical marker disposed integrally on a portion of the first sheet;

a second radiopaque anatomical marker disposed integrally on a portion of the second sheet;

a closure flap extending from the fourth edge of the second sheet, the closure flap having an external surface and an attachment surface opposite the external surface;

an adhesive coating disposed over at least a portion of the attachment surface of the closure flap; and a release sheet removably disposed over the adhesive coating, at least one of the adhesive coating and the release sheet further having color-coding indicating intended lateral anatomical placement.

2. The disposable radiograph cassette cover according to claim 1, wherein each of the first and second sheets having a line of weakening perforations disposed across the sheet parallel and adjacent to the fourth edge thereof.

3. The disposable radiograph cassette cover according to claim 1, wherein the first and second radiopaque anatomical markers are color-coded to indicate intended lateral anatomical placement.

4. The disposable radiograph cassette cover according to claim 1, wherein the first and second sheets are formed of thin, pliable, electromagnetically transparent material having a low coefficient of friction.

5. The disposable radiograph cassette cover according to claim 1, wherein the first and second sheets are formed of polyethylene plastic.

6. The disposable radiograph cassette cover according to claim 1, wherein the first and second sheets further include corner reinforcement gussets.

7. A disposable radiograph cassette cover, comprising:

a first sheet having first through fourth edges;

a second sheet having first through fourth edges, the first through third edges of the second sheet being congruent with and sealed to the corresponding edges of the first sheet, the first and second sheets defining a radiograph cassette pocket therebetween;

a closure flap extending from the fourth edge of the second sheet, the closure flap having an external surface and an attachment surface opposite the external surface;

an adhesive coating disposed over at least a portion of the attachment surface of the closure flap; and a release sheet removably disposed over the adhesive coating;

wherein at least one of the adhesive coating and the release sheet is color-coded to indicate intended lateral anatomical placement.

8. The disposable radiograph cassette cover according to claim 7, wherein:

a first radiopaque anatomical marker is disposed integrally on a portion of the first sheet; and a second radiopaque anatomical marker is disposed integrally on a portion of the second sheet.

9. The disposable radiograph cassette cover according to claim 8, wherein the first and second radiopaque anatomical markers are color-coded to indicate intended lateral anatomical placement.

10. The disposable radiograph cassette cover according to claim 7, wherein each of the first and second sheets has a line of weakening perforations extending across the sheet parallel and adjacent to the fourth edge thereof.

11. The disposable radiograph cassette cover according to claim 7, wherein the first and second sheets are formed of thin, pliable, electromagnetically transparent material having a low coefficient of friction.

12. The disposable radiograph cassette cover according to claim 7, wherein the first and second sheets are formed of polyethylene plastic.

13. The disposable radiograph cassette cover according to claim 7, wherein the first and second sheets further include corner reinforcement gussets.

14. A disposable radiograph cassette cover, comprising:

a first sheet having first through fourth edges;

a second sheet having first through fourth edges, the first through third edges of the second sheet being congruent with and sealed to the corresponding edges of the first sheet, the first and second sheets defining a radiograph cassette pocket therebetween, each of the sheets having a line of weakening perforations extending across the sheet parallel and adjacent to the fourth edge thereof;

a closure flap extending from the fourth edge of the second sheet, the closure flap having an external surface and an attachment surface opposite the external surface;

an adhesive coating disposed over at least a portion of the attachment surface of the closure flap; and a release sheet removably disposed over the adhesive coating, wherein at least one of the adhesive coating and the release sheet is color-coded to indicate intended lateral anatomical placement.

15. The disposable radiograph cassette cover according to claim 14, wherein:

a first radiopaque anatomical marker is disposed integrally on a portion of the first sheet; and a second radiopaque anatomical marker is disposed integrally on a portion of the second sheet.

16. The disposable radiograph cassette cover according to claim 15, wherein the first and second radiopaque anatomical markers further include color coding indicating intended lateral anatomical placement.

17. The disposable radiograph cassette cover according to claim 14, wherein the first and second sheets are formed of thin, pliable, electromagnetically transparent plastic material having a low coefficient of friction.

18. The disposable radiograph cassette cover according to claim 14, wherein the first and second sheets further include corner reinforcement gussets.

* * * * *